July 1, 1930.  J. A. ANGLADA  1,769,614
MULTIPLE SPEED MECHANISM
Filed July 20, 1923  3 Sheets-Sheet 1
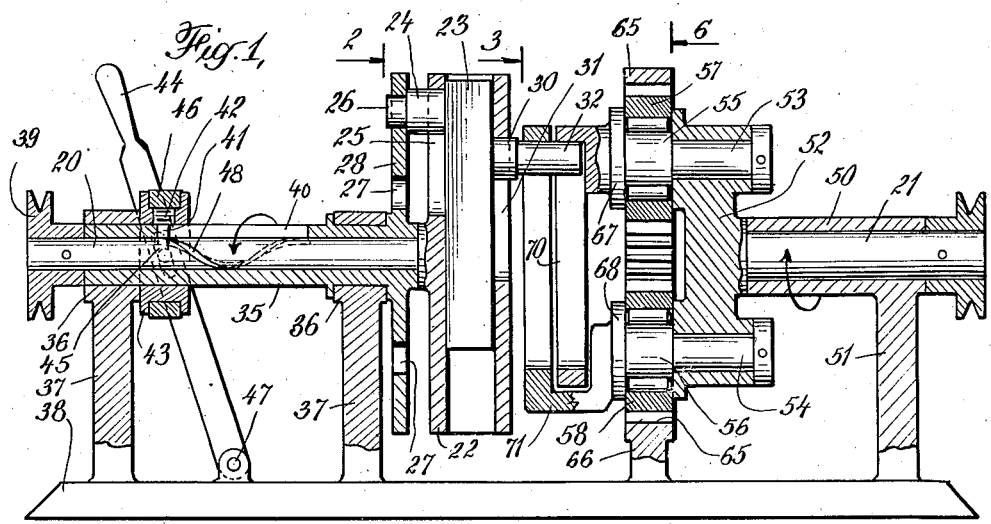
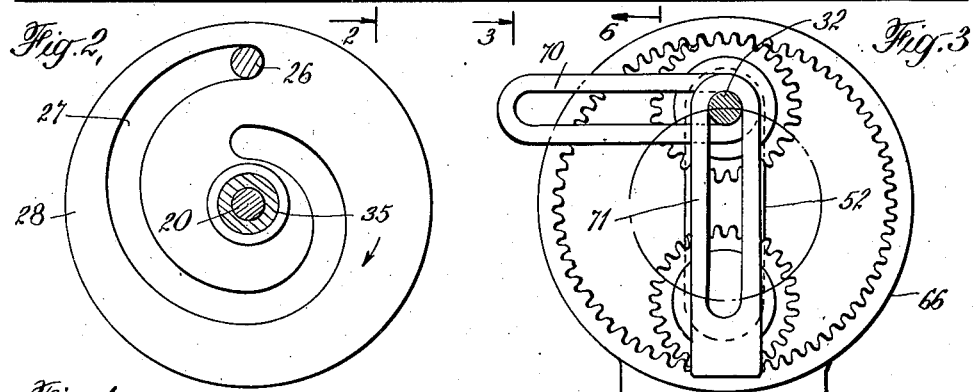
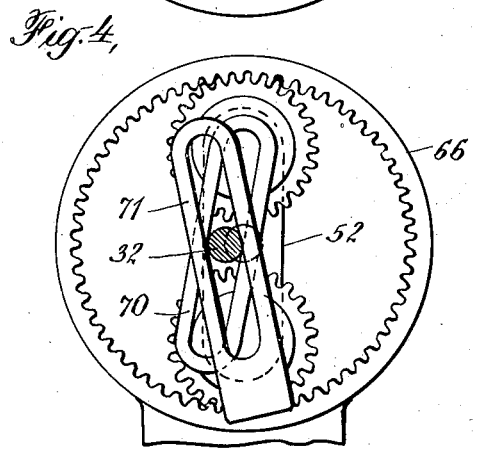
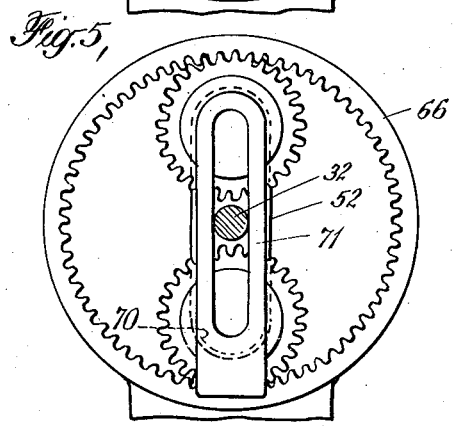
INVENTOR
Joseph A. Anglada
BY
E. W. Marshall
ATTORNEY July 1, 1930.  J. A. ANGLADA  1,769,614
MULTIPLE SPEED MECHANISM
Filed July 20, 1923   3 Sheets-Sheet 2
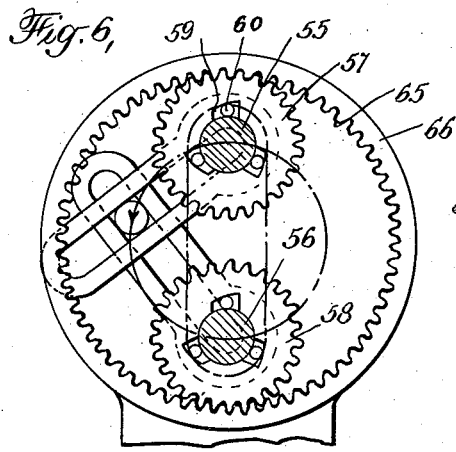
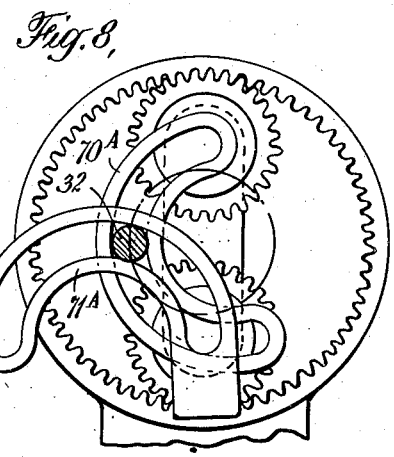
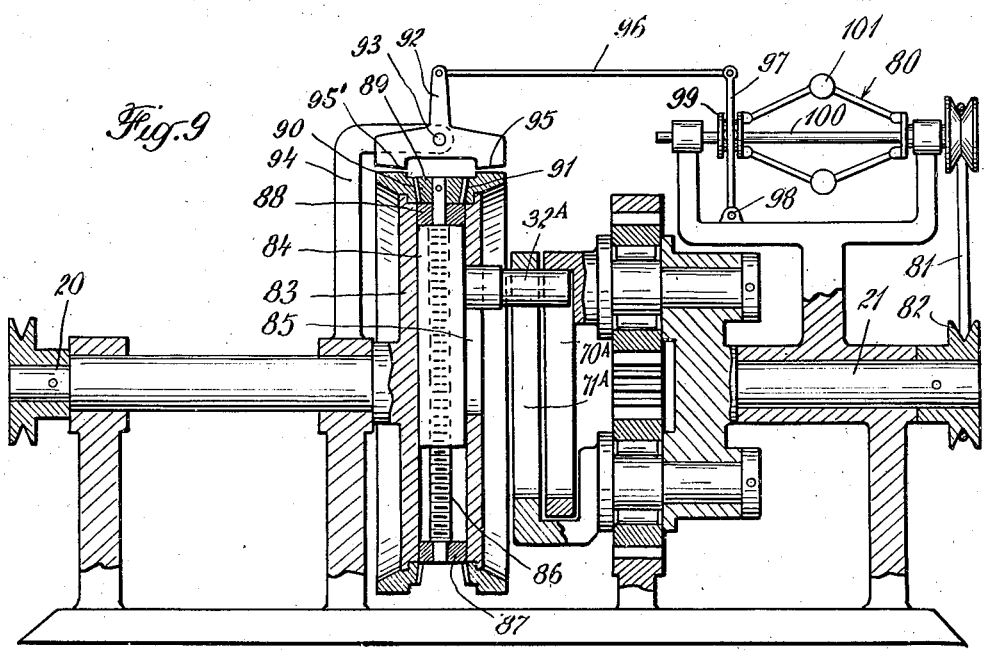
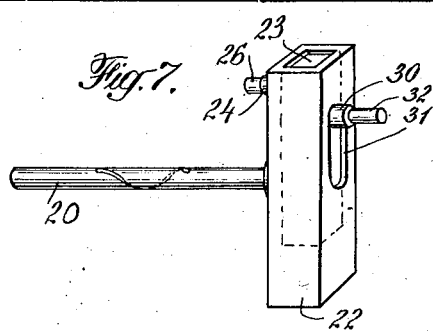
INVENTOR
Joseph A. Anglada
BY
ATTORNEY July 1, 1930.                J. A. ANGLADA                1,769,614
                       MULTIPLE SPEED MECHANISM
                  Filed July 20, 1923       3 Sheets-Sheet 3

INVENTOR
Joseph A. Anglada
BY
E. W. Marshall
ATTORNEY

Patented July 1, 1930

1,769,614

UNITED STATES PATENT OFFICE

JOSEPH A. ANGLADA, OF JENKINTOWN, PENNSYLVANIA

MULTIPLE-SPEED MECHANISM

Application filed July 20, 1923. Serial No. 652,712.

This invention relates to mechanical movements and, particularly, to multiple speed motion transmitting or driving mechanisms.

As is well known, most of the change speed mechanisms now in use provide for a limited number of speed changes and in changing from one speed to another, speed and driving effort are lost. Moreover, with most of such devices the change must be effected with considerable care and requires considerable skill since certain gears are thrown out of mesh and other gears are thrown into mesh.

This invention has for its salient object to provide mechanism by means of which any speed from zero to maximum can be readily and easily obtained by the manipulation of simple control means requiring no skill or care for its operation.

Another object of the invention is to provide speed transforming mechanism by means of which an infinite variety of speeds ranging from zero to maximum can be obtained at the will of the operator and without loss of driving effort or speed during the transitional period.

Another object of the invention is to provide mechanism of the character described by means of which the ratio of speed to torque is always maintained constant.

Another object of the invention is to provide speed transforming mechanism so constructed and arranged that the product of the torque times the speed is always constant or, in other words, as the speed increases, the torque correspondingly decreases and vice versa.

Further objects of the invention will appear from the following specification taken in connection with the drawings, which form a part of this application and in which, Fig. 1 is a longitudinal sectional elevation of one form of multiple speed mechansim constructed in accordance with the invention.

Fig. 2 is a sectional elevation taken substantially on line 2—2 of Fig. 1.

Fig. 3 is a sectional elevation taken substantially on line 3—3 of Fig. 1, but showing one of the levers angularly displaced.

Fig. 4 is a sectional elevation similar to Fig. 3, but showing the driving pin adjusted to a different position from that shown in Fig. 3.

Fig. 5 is a sectional elevation similar to Figs. 3 and 4, but showing the driving pin adjusted to zero position.

Fig. 6 is a view similar to Fig. 3, but showing the motion transmitting levers and the position taken subsequent to the position shown in Fig. 3, this view being taken substantially on line 6—6 of Fig. 1.

Fig. 7 is a perspective view of a portion of the speed control mechanism.

Fig. 8 is a view similar to Figs. 1 to 6 inclusive, but showing curved levers instead of straight levers.

Fig. 9 is a sectional elevation similar to Fig. 1, but showing automatic control mechanism for the speed changing mechanism.

Figure 10:
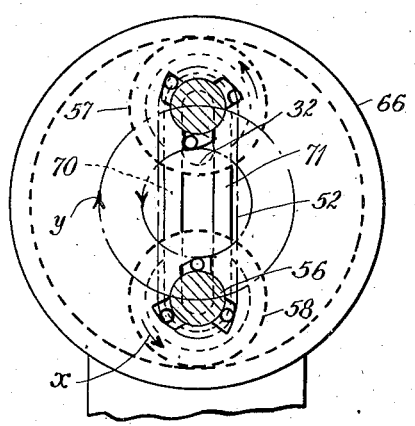
Figs. 10, 11, 12 and 13 are diagrammatic elevational views showing successive positions of the driving levers as the driving pin travels around the axis of the drive shaft.

The invention briefly described comprises a driving element, a driven element and speed changing means interposed between these elements. The speed changing means comprises a plurality of adjustable leverages driven from a driving pin or crank and this pin is adjustable toward and away from the driving shaft. The driving pin and leverages are so constructed and arranged that an infinite variety of speeds between zero and maximum can be obtained. Further details of the invention will appear from the following description.

Referring, first, to the embodiment of the invention illustrated in Figs. 1 to 7 inclusive, the change speed mechanism comprises a drive shaft 20, a driven shaft 21 and means interposed between these shafts for changing the speed of rotation of the shaft 21 with respect to the speed of rotation of the shaft 20.

The shaft 20 has secured thereto an elongated box 22 having slidably mounted therein a block 23. The block 23 has formed on or secured to one side thereof a stud 24 which extends through a slot 25 formed in the box 22 and this stud 24 has a reduced extension 26 which is positioned in a spiral slot 27 formed in a cam disc 28.

The block 23 has formed on or secured to its opposite face a stud 30 which extends through a slot 31 in the box 22 and the stud 30 has a reduced extension or pin 32 which transmits the drive through gearing hereinafter described to the driven shaft 21.

In the particular form of the invention shown in Figs. 1 to 7 inclusive, the cam disc 28 has formed on or secured thereto an elongated sleeve 35 mounted in bearings 36 formed in standards 37 carried by a base 38.

The shaft 20 is mounted in the sleeve 35 and extends therethrough and the box 22 is secured to one end of the shaft and the other end of the shaft is connected by a sheave 39, or other suitable means, to a source of power.

The speed of the driven element is controlled by the distance between the driving pin 32 and the axis of the drive shaft 20 and this distance is in turn controlled by the cam disc 28. Since the pin 32 and the extension 26 of the stud 24 are both mounted on the block 23, as the extension 26 is moved toward or away from the axis of the shaft 20, the pin 32 will be correspondingly moved.

In the particular form of the invention being described, the distance of the extension 26 from the axis of the drive shaft is controlled by adjusting the cam disc 28. In order to effect the rotation of this cam disc, the sleeve 35 has formed therein an elongated slot 40 and in this slot there is positioned a pin 41 carried by a screw 42 and the screw 42 is in turn carried by a collar 43 slidably mounted on the sleeve 35. The pin 41 extends into a spiral slot 48 formed in the shaft 20 and as the collar and pin are moved along the sleeve the spiral slot will cause relative rotation between the shaft and sleeve and the extension 26 will move in cam slot 27, toward or away from the axis of shaft 20. The position of the collar on the sleeve is controlled by a lever 44 connected by a pin and slot connection 45 to a yoke 46.

As the lever is swung about its pivot 47, the collar 43 will be moved along the sleeve 35 and through the engagement of the pin 41 carried by the collar and the slot 40 formed in the sleeve, the sleeve will be rotated, carrying with it the cam disc 28. As this cam disc is rotated, the extension 26, stud 24 and block 23 will be moved accordingly and the driving pin 32 will be moved toward or away from the axis of the driving shaft.

The drive is transmitted from the driving pin 32 to the driven shaft 21 in the following manner. In the form of the invention shown in Figs. 1 to 7, the driven shaft 21 is mounted in a bearing 50 carried by an upright or standard 51 mounted on the base 38. The shaft 21 has formed thereon or secured thereto a cross arm 52 which has mounted at its opposite ends stub shafts 53 and 54. These stub shafts have enlarged portions 55 and 56 formed thereon and the portions 55 and 56 are in turn mounted respectively in pinions 57 and 58. These pinions have wedge-shaped notches 59 formed therein and rollers 60 are positioned in the notches and between the pinions and the portions 55, 56. The structure just described forms a roller clutch between the portions 55, 56 and the gears 57, 58.

The gears 57, 58 are positioned within and mesh with a stationary internal gear 65 which is carried by an upright or standard 66 fixed to the base 38.

The portions 55 and 56 have formed thereon at one end thereof respectively flanges or heads 67, 68 which engage the faces at one end of the pinions 57, 58.

The head or flange 67 has formed thereon or secured thereto an elongated slotted arm or lever 70 and the head 68 has formed therein or secured thereto an arm or lever 71. The lever 71 is offset as shown in Fig. 1 to receive the end of the lever 70, these levers being disposed in overlapping position.

The driving pin 32 hereinbefore described is received in the slots of the levers 70 and 71 and the drive is transmitted from this pin through the levers to the driven shaft 21 in the following manner.

In the embodiment of the invention illustrated in this application two levers and two pinions are utilized, but it should be understood that more than two may be used, if desired. When two levers and two pinions are utilized, these parts operate successively and while one lever and its pinion are transmitting the drive to the driven shaft, the other lever and its pinion are "taking up". The distance of the driving pin 32 from the axis of the drive shaft determines the amount of throw of the levers. When the pin 32 is disposed in alinement with the axis of the drive shaft 20, as shown in Fig. 5, no motion is transmitted from the drive shaft to the driven shaft since the pin 32 has no movement about the axis of the drive shaft and, therefore, rotates freely within the levers but transmits no movement thereto.

In Fig. 4, the pin 32 is slightly offset from the axis or center of rotation of the drive shaft and the levers 70, 71 are oscillated through a slight angle as this pin rotates.

When the pin 32 has been moved away from the axis of the drive shaft a distance equal to the distance between this axis and the axis of one of the pinions as illustrated in Figs. 3 and 6, the pin will move in the slots of the links to the position shown in Fig. 3 and further rotation of the pin will then result in a direct drive from the drive shaft to the driven shaft. In other words, the speed of the driven shaft will equal the speed of the drive shaft.

In Figs. 10 to 13 inclusive, the relative position of the levers 70 and 71 are shown at different points in the rotation of the driving pin. In Fig. 10, assuming that the pin 32 is rotating in an anti-clockwise direction, the lever 70 is "taking up" and the lever 71 is rotating the portion 56 and through the roller clutch and pinion 58. The pinion 58 will be rotated in the direction of the arrow $x$ and the arm 52 and shaft 21 will be rotated in a clockwise direction or in the direction of the arrow $y$.

Figure 11:
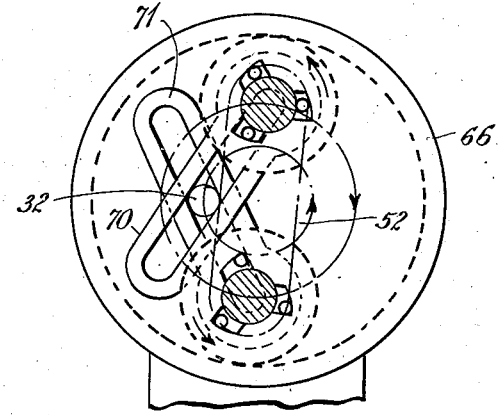

In Fig. 11, the lever 71 is "taking up" and the lever 70 is driving.

Figure 12:
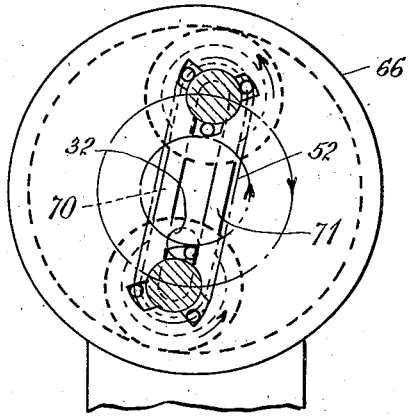

In Fig. 12, the lever 70 is driving and the lever 71 is "taking up."

Figure 13:
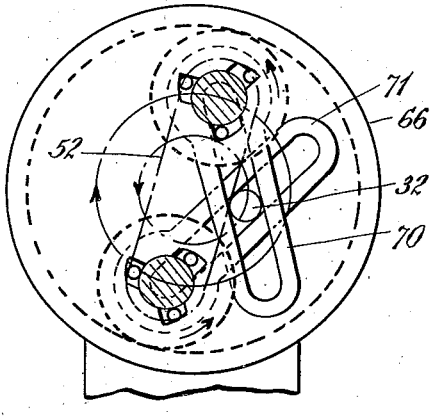

In Fig. 13, the lever 71 is driving and the lever 70 is "taking up."

It will be noted that the rotation of the pin 32 causes the levers 70 and 71 to oscillate alternately in opposite directions. When one of these levers is oscillating in one direction, the other lever will be oscillating in the other direction and, therefore, while one lever is transmitting the drive, the other lever will be "taking up." The drive will, therefore, be continuous. Since the pinions are both carried by the same arm, they will both roll around in the internal gear at all times during the drive although only one of the pinions is actually driving at one time. Also it will be seen that rotation of the pin 32 in either direction will transmit the drive to the driven shaft and, furthermore, no matter which way the pin 32 is rotated around the axis of the drive shaft, the driven shaft will always be rotated in the same direction.

Since the oscillation of the levers by the driving pin effects the rotation of the driven shaft, an oscillation of the drive shaft will cause a rotation of the driven shaft since the pinions will be ratcheted around by the levers even though the driving pin does not travel continuously around the driven shaft axis.

In Fig. 8, the levers 70A and 71A are longitudinally curved instead of straight as shown in the preceding figures. These levers operate substantially in the same manner as those already described but the curvature in the form illustrated eliminates lost motion due to the travel of the driving pin 32 longitudinally in the slot of the lever at certain periods in the operation of the device without effecting oscillation of the lever.

In Figs. 1 to 7 inclusive manual control means for the speed changing mechanism is illustrated. In Fig. 9, however, the device is shown as adapted for automatic control of the speed changing mechanism and in this particular embodiment the automatic control is connected to the driven element.

Referring to Fig. 9, there is illustrated a governor 80 connected by a belt 81 to a sheave 82 carried by the driven shaft 21.

The drive shaft 20 has connected thereto at its inner end a casing or box 83 similar to the box 22. This box has slidably mounted therein a block 84 and the block has secured to one face thereof a driving pin 32A similar to the pin 32. This pin extends through a longitudinal slot 85 in the box 83 and engages the levers 71A and 70A in the same manner as in the other embodiment of the invention.

A longitudinally threaded screw shaft 86 is rotatably mounted at its ends in bearings 87 and 88 secured in the ends of the box 83. The shaft 86 extends through and is threaded into the block 84. The upper end of the shaft has secured thereto a beveled pinion 89 which meshes at diametrically opposite points thereof with ring gears 90 and 91 rotatably mounted on the outer ends of the box 83.

Means is provided for holding either one of the ring gears 90, 91 against rotation and this means consists of a lever 92 pivoted at 93 on a fixed bracket 94 and having bifurcated lower ends 95, 95' adapted to engage either of the ring gears as this lever is oscillated or moved about its pivot 93.

The lever 92 is controlled by the govenor 80 and is connected by a link 96 to a link 97 which in turn is mounted on a fixed pivot 98. The link 97 engages a collar 99 slidably mounted on a governor shaft 100. The position of this collar on the shaft is controlled by governor balls 101 in the usual manner.

The control mechanism just described operates as follows and is intended to provide a constant speed drive for the driven shaft. When the speed of the shaft 21 tends to increase, the governor balls 101 will fly outwardly, pulling the collar 99 along the shaft 100 and through the links 97, 96, swinging the lever 92 about its pivot in a clockwise direction. This will cause the end 95 of the lever to engage the ring gear 91 and hold this gear stationary, which in turn will rotate the beveled pinion 89 in a direction to cause the driving pin 32A to travel toward the axis of the drive shaft 20 thereby cutting down the speed of the driven shaft. When the speed of the driven shaft tends to fall below the desired speed, the governor balls will move inwardly toward the governor shaft thereby oscillating the lever 92 in a counterclockwise direction into engagement with the ring gear 90, causing the driving pin 32A to move outwardly and increase the speed of rotation of the driven shaft.

Figure 14:
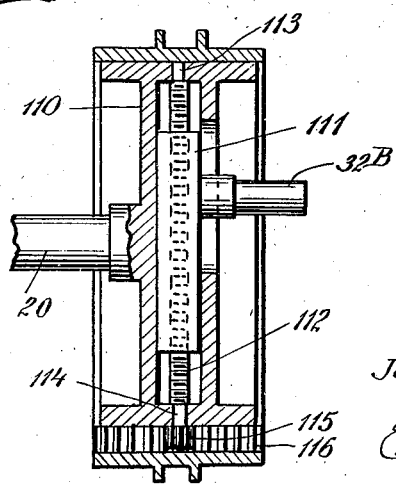
Fig. 14 is a sectional elevation illustrating still another form of control mechanism for the speed changing mechanism.

Still another form of control means for the speed changing mechanism is illustrated in Fig. 14. In this construction a box or casing 110 is connected to the end of the drive shaft 20 and a block 111 is slidably mounted in this casing. A screw shaft 112 is rotatably mounted at its ends 113, 114 in the casing 110 and extends through and in threaded engagement with the block 111. At the end 114 the shaft has mounted thereon a pinion 115 which meshes with a rack 116. This rack may be engaged by a lever or any other suitable actuating means and as the rack is reciprocated, the shaft 112 will be rotated, thereby causing the block 111 and driving pin 32B to move toward or away from the axis of the drive shaft 20.

From the foregoing description it will be seen that the change speed mechanism illustrated and described will provide an infinite number of speeds between zero and maximum and, furthermore, that the change in speed can be effected easily and readily without any danger of stripping gears or otherwise damaging the mechanism.

Moreover, it will be evident that throughout the multiplicity of changes in speed the ratio between the torque or driving effort and the speed will always be maintained constant.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. Multiple speed mechanism comprising a rotatable driving element, a rotatable driven element, a plurality of slotted levers, an adjustable crank pin carried by the driving element and disposed in the lever slots, means for adjusting said crank pin, a one way clutch, a gear operatively connected thereby to each of said levers for actuation by its lever, and a stationary ring gear engaged by said gears for transmitting the drive between said elements, said first mentioned gears being mounted on said driven elements, for bodily movement by said crank pin and levers around the axis of the driven element and rotatable on their own axes.

2. Multiple speed mechanism comprising a rotatable driving element, a rotatable driven element, a plurality of overlapping levers, an adjustable crank pin engaged therewith, means for adjusting said crank pin, a one-way clutch, a gear operatively connected thereby to each of said levers for actution by its lever, and a stationary ring gear engaged by said gears for transmitting the drive between said elements, said first mentioned gears being mounted on said driven element, for movement bodily by said pin and levers around the axis of the driven element and rotatable on their axes.

3. Multiple speed mechanism comprising a rotatable driving element, a rotatable driven element, and change speed means between said elements including gears mounted on the driven element and bodily movable therewith and rotatable on their axes, a one-way clutch, and a slotted oscillatable lever operatively connected thereby to each of said gears, a stationary gear engaged by said gears, and a crank pin carried by the driving element engaging said levers and adjustable longitudinally thereof, and means for adjusting said crank pin.

4. Multiple speed mechanism comprising a rotatable driving element, a rotatable driven element, and means for transmitting the drive between said elements including a plurality of overlapping levers operatively connected to said driven element, a one-way clutch, a gear operatively connected thereby to each of said levers for actuation by its lever and mounted on said driven element for bodily movement in a circular path, a stationary gear engaging said rotatable gears, and a crank pin carried by the driving element and operatively connected to said levers and adjustable toward and away from the axis of the driving element, said first mentioned gears being bodily movable by said crank pin, and means for adjusting said crank pin.

5. Multiple speed mechanism comprising a rotatable drive shaft, a rotatable driven member, a plurality of gears carried by and mounted for bodily rotation around the axis of the driven member and for pivotal rotation on their axes, a one-way clutch, a slotted lever operatively connected thereby to rotate each gear on its axis, a fixed gear engaged by said rotatable gears, and adjustable means operatively connected to the drive shaft for varying the length of and for actuating the lever arms and for bodily rotating the gears around the axis of the driven member.

6. In combination, a drive shaft, an adjustable crank pin connected thereto, a plurality of overlapping levers operatively connected to said pin, a gear adapted to be rotated by each lever, a one-way clutch operatively connecting said gear to its lever, a stationary gear engaged by said gears, a driven shaft and a member connected to said driven shaft, said rotatable gears being pivoted to said member.

7. In combination, a drive shaft, an adjustable crank pin connected thereto, a plurality of overlapping levers operatively connected to said pin, a gear adapted to be rotated by each lever, a one-way clutch operatively connecting said gear to its lever, a ring gear engaged by said rotatable gears, a driven shaft and a member connected to said driven shaft, said gears being pivoted to said member, said ring gear being fixed.

8. In combination, a drive shaft, an adjustable crank pin connected thereto, a plurality of overlapping levers operatively connected to said pin, a gear adapted to be rotated by each lever, a one-way clutch operatively connecting said gear to its lever, a driven shaft and a member connected to said driven shaft, said gears being pivoted to said member about the axis of the driven shaft and a stationary gear engaged by said rotatable gears.

9. Multiple speed mechanism comprising a drive shaft, a driven member, a plurality of gears supported by the driven member, bodily movable around the axis of the driven member and rotatable on their axes, a one-way clutch connected to each of said gears, a fixed gear meshing with said gears, a slotted lever operatively connected to rotate each gear in one direction on its axis through said clutch and adjustable means operable by the driven member for controlling the throw of said levers.

In witness whereof, I have hereunto set my hand this 17th day of July, 1923.

JOSEPH A. ANGLADA.